(12) United States Patent
Hatta et al.

(10) Patent No.: US 11,456,600 B2
(45) Date of Patent: Sep. 27, 2022

(54) ENERGY MANAGEMENT SYSTEM, INDEPENDENT SYSTEM, AND OPERATION METHOD OF INDEPENDENT SYSTEM

(71) Applicant: NGK Insulators, Ltd., Nagoya (JP)

(72) Inventors: Tetsuya Hatta, Kuwana (JP); Hiroyuki Abe, Anjo (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/301,776

(22) Filed: Apr. 14, 2021

(65) Prior Publication Data
US 2021/0234375 A1 Jul. 29, 2021

Related U.S. Application Data

(63) Continuation of application No. PCT/JP2019/036035, filed on Sep. 13, 2019.

(30) Foreign Application Priority Data

Oct. 18, 2018 (JP) .............................. JP2018-196370

(51) Int. Cl.
*H02J 7/00* (2006.01)
*H02J 3/00* (2006.01)
(Continued)

(52) U.S. Cl.
CPC ........... *H02J 3/381* (2013.01); *H01M 10/054* (2013.01); *H01M 10/425* (2013.01);
(Continued)

(58) Field of Classification Search
CPC .. H02J 3/381; H02J 3/003; H02J 3/466; H02J 3/004; H02J 3/32; H02J 7/0047;
(Continued)

(56) References Cited

U.S. PATENT DOCUMENTS

2010/0047672 A1 2/2010 Tamakoshi

FOREIGN PATENT DOCUMENTS

JP 2010-051074 A1 3/2010
JP 2013-176234 A1 9/2013
(Continued)

OTHER PUBLICATIONS

International Search Report and Written Opinion (Application No. PCT/JP2019/036035) dated Nov. 5, 2019.
(Continued)

*Primary Examiner* — Robert L Deberadinis
(74) *Attorney, Agent, or Firm* — Burr & Brown, PLLC

(57) ABSTRACT

Regarding an independent system, a prediction value of charged/discharged power of a storage battery is calculated, based on a prediction value of generated power of a renewable energy power generator, a prediction value of demanded power of a control device, and a prediction value of demanded power of a load on an assumption that a power supply limit is applied to the load. Whether or not charge or discharge of the storage battery with charged/discharged power matching the prediction value of the charged/discharged power of the storage battery is possible is determined. The power supply limit is tightened when it is determined that the charge or discharge of the storage battery is not possible. A limit data indicating a detail of the power supply limit is output when it is determined that the charge or discharge of the storage battery is possible.

20 Claims, 7 Drawing Sheets

(51) Int. Cl.
| | |
|---|---|
| *H02J 3/46* | (2006.01) |
| *H01M 10/42* | (2006.01) |
| *H02J 3/38* | (2006.01) |
| *H01M 10/613* | (2014.01) |
| *H01M 10/63* | (2014.01) |
| *H01M 10/6563* | (2014.01) |
| *H01M 10/054* | (2010.01) |
| *H02J 3/32* | (2006.01) |
| *H02J 7/35* | (2006.01) |

(52) U.S. Cl.
CPC ......... *H01M 10/613* (2015.04); *H01M 10/63* (2015.04); *H01M 10/6563* (2015.04); *H02J 3/003* (2020.01); *H02J 3/004* (2020.01); *H02J 3/32* (2013.01); *H02J 3/466* (2020.01); *H02J 7/0047* (2013.01); *H01M 2010/4271* (2013.01); *H01M 2010/4278* (2013.01); *H02J 7/35* (2013.01); *H02J 2300/10* (2020.01); *H02J 2300/20* (2020.01)

(58) Field of Classification Search
CPC ...... H02J 2300/10; H02J 2300/20; H02J 7/35; H01M 10/63; H01M 10/6563; H01M 10/054; H01M 10/425; H01M 2010/4271; H01M 2010/4278
See application file for complete search history.

(56) References Cited

FOREIGN PATENT DOCUMENTS

| | | |
|---|---|---|
| JP | 2015-076907 A1 | 4/2015 |
| JP | 2015-208129 A1 | 11/2015 |

OTHER PUBLICATIONS

English translation of the International Preliminary Report on Patentability (Chapter I)(Application No. PCT/JP2019/036035) dated Apr. 29, 2021.

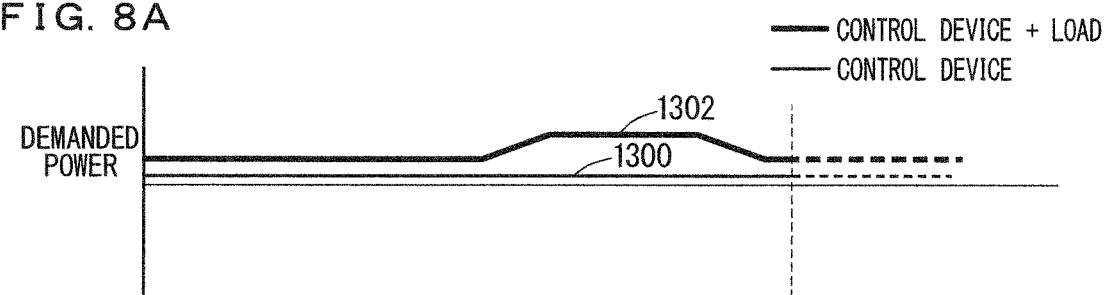
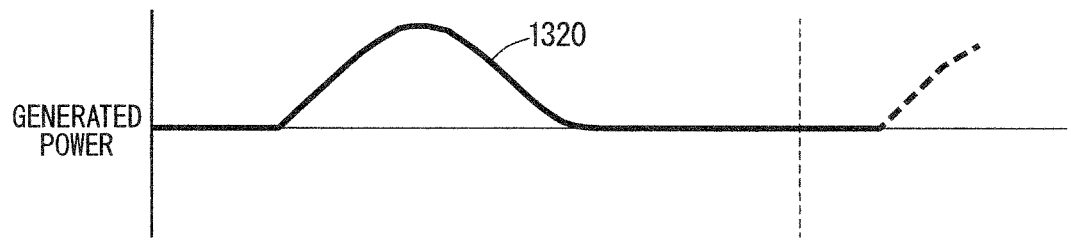
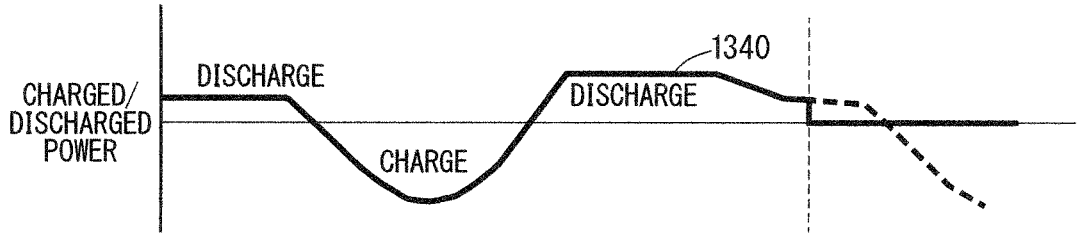
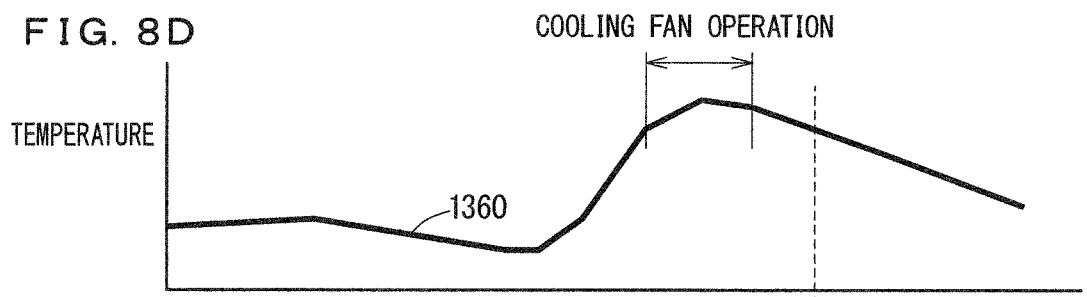
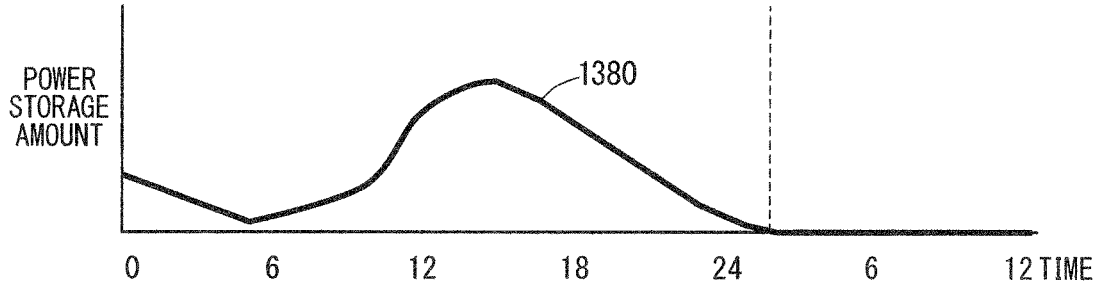

ENERGY MANAGEMENT SYSTEM, INDEPENDENT SYSTEM, AND OPERATION METHOD OF INDEPENDENT SYSTEM

BACKGROUND OF THE INVENTION

Field of the Invention

The present invention relates to an energy management system, an independent system, and an operation method of the independent system.

Description of the Background Art

An independent system is constructed in an isolated island, a remote location, or the like, and is not interconnected to other systems. The independent system is also referred to as an independent power system or the like.

The independent system in many cases includes a renewable energy power generator, a storage battery, a control device, and a load. The renewable energy power generator, the storage battery, and the control equipment constitute a power supply system that supplies power. The control equipment controls the renewable energy power generator and the storage battery. The renewable energy power generator generates power. The storage battery is charged with power that is generated by the renewable energy power generator. The control equipment and the load are supplied with power generated by the renewable energy power generator and power discharged from the storage battery.

An independent system described in Japanese Patent Application Laid-Open No. 2010-51074 includes a wind power generation device, a sodium-sulfur battery, a heater, and a control device. The wind power generation device supplies power to the control device and the heater. The sodium-sulfur battery compensates for output fluctuation of power generated by the wind power generation device, and supplies the power to the heater and the control device. Charge/discharge of the sodium-sulfur battery is controlled so as not to reach to a charge end or discharged end by managing and monitoring remaining capacity with the control device or the like and changing a limiter of the wind power generation device.

An independent-type power supply system described in Japanese Patent Application Laid-Open No. 2013-176234 includes a solar power generation device, a power storage device, a controller, and a load device. The solar power generation device generates DC power, and converts the generated DC power to AC power. In the power storage device, generated power of the solar power generation device is charged. The load device is supplied with combined output of both of the solar power generation device and the power storage device. When there is a deficiency in the power generation amount and the state of charge SOC(t) falls below a minimum charge power energy Smin, the control device prevents the deficiency of the state of charge SOC(t) by limiting demanded power Pd of the load device and increasing the charge amount of the power storage device.

In the independent system, generated power of the renewable energy power generator is approximately equal to or less than the sum of the demanded power of the control equipment and the load in some cases. Some examples such cases include a case in which more devices as loads are provided and the demanded power is thus increased, a case in which there is failure in the renewable energy power generator, and a case in which the generated power of the renewable energy power generator is reduced due to bad weather or the like. In those cases, the power storage amount of the storage battery is reduced.

Meanwhile, when the power storage amount of the storage battery is reduced and the supply of power to the control equipment is thus stopped, failure, deterioration, or the like may occur in the devices included in the power supply system.

Further, when the power storage amount of the storage battery is reduced and the supply of power to the control equipment is thus stopped, the operation of the power supply system cannot be resumed unless operation of restarting the power supply system is performed. However, the operation of restarting the power supply system can be performed only by a person skilled at the operation of the power supply system. Meanwhile, in many cases, a person skilled at the operation of the power supply system is not permanently stationed in the isolated island the remote location, or the like where the independent system is constructed. Thus, a time period required until a person skilled at the operation of the power supply system arrives at the isolated island, the remote location, or the like where the independent system is constructed and performs the operation of restarting the power supply system is prone to be long, and accordingly a time period required for resuming the operation of the power supply system is prone to be long.

In the independent system described in Japanese Patent Application Laid-Open No. 2010-51074, when the generated power of the wind power generation device is sufficiently more than the sum of the entire demanded power of loads including the heater and the control equipment, power can be supplied to all of the loads. However, when the generated power of the wind power generation device is equal to or less than the sum of the demanded power described above, power cannot be supplied to all of the loads, thus stopping the supply of power to the heater and the control device.

In the independent-type power supply system described in Japanese Patent Application Laid-Open No. 2013-176234, the supply of power to the controller is not taken into consideration. Thus, the independent-type power supply system cannot solve the problem described above.

SUMMARY

The present invention is intended for an energy management system.

The independent system includes a renewable energy power generator, a storage battery, a control device, and a load.

The energy management system includes a calculation part, a determination part, a changing part, and a limit data output part.

Regarding the independent system, the calculation part calculates a prediction value of charged/discharged power of the storage battery, based on a prediction value of generated power of the renewable energy power generator, a prediction value of demanded power of the control device, and a prediction value of demanded power of the load on an assumption that power is supplied under a predetermined power supply limit.

The determination part determines whether or not charge or discharge of the storage battery with power matching the prediction value of the charged/discharged power of the storage battery is possible.

The changing part changes details of the power supply limit so that the power supply limit for the load is tightened when it is determined that the charge or discharge of the storage battery is not possible.

The limit data output part outputs a limit data indicating a detail of the power supply limit when it is determined that the charge or discharge of the storage battery is possible.

The present invention is also intended for an independent system including the energy management system, and an operation method of the independent system.

Effects of the Invention

According to the present invention, when it is predicted that power cannot be supplied to all of the control device and the load in the independent system, the details of the power supply limit to be applied to the load in order to maintain the supply of power to the control device can be identified based on the limit data. Thus, the capability of maintaining the supply of power to the control device is enhanced in the independent system, and the independent system can be caused to stably operate.

Therefore, the problem to be solved by the present invention is to increase the probability of enabling maintenance of supply of power to a control device in an independent system and to enable stable operation of the independent system.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 8A to 8E are graphs showing examples of time-dependent change of demanded power, generated power, charged/discharged power, temperature, and a power storage amount when a power supply limit is not applied to the load.

DESCRIPTION OF THE PREFERRED EMBODIMENTS

1 Independent System

Figure 1:
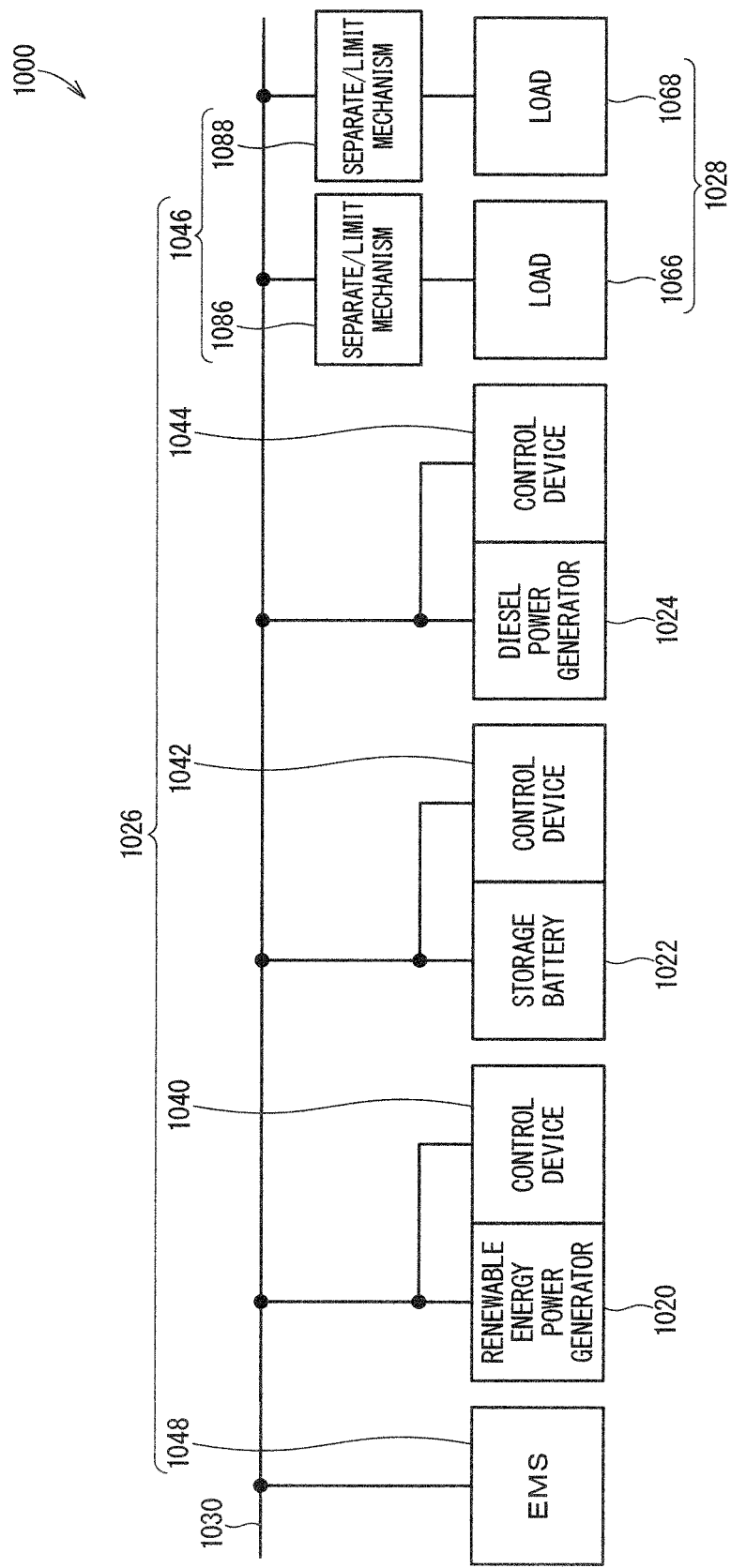
FIG. 1 is a block diagram illustrating an independent system.

FIG. 1 is a block diagram illustrating an independent system according to the present embodiment.

An independent system 1000 illustrated in FIG. 1 includes a renewable energy power generator 1020, a storage battery 1022, a diesel power generator 1024, a control device 1026, a load 1028, and a power distribution line 1030. The control device 1026 includes a control device 1040 that controls the renewable energy power generator 1020, a control device 1042 that controls the storage battery 1022, a control device 1044 that controls the diesel power generator 1024, a limit mechanism 1046, and an energy management system (EMS) 1048. The load 1028 includes individual loads 1066 and 1068. The limit mechanism 1046 includes separate/limit mechanisms 1086 and 1088.

The renewable energy power generator 1020, the storage battery 1022, the diesel power generator 1024, the control device 1040, the control device 1042, the control device 1044, the separate/limit mechanism 1086, the separate/limit mechanism 1088, and the EMS 1048 are electrically connected to the power distribution line 1030. The individual loads 1066 and 1068 are electrically connected to the power distribution line 1030 via the separate/limit mechanisms 1086 and 1088, respectively. In this manner, the storage battery 1022 can be charged with power generated by the renewable energy power generator 1020 and the diesel power generator 1024. Further, power generated by the renewable energy power generator 1020 and the diesel power generator 1024 and power discharged from the storage battery 1022 can be supplied to the control device 1040, the control device 1042, the control device 1044, the separate/limit mechanism 1086, the separate/limit mechanism 1088, and the EMS 1048, and can be supplied to the individual loads 1066 and 1068 via the separate/limit mechanisms 1086 and 1088, respectively. The supply of power to the individual loads 1066 and 1068 is controlled by the separate/limit mechanisms 1086 and 1088, respectively.

Examples of the renewable energy power generator 1020 include a solar power generator, a wind power generator, a flow-in type hydroelectric power generator, a geothermal power generator, a solar thermal power generator, a biomass power generator, and the like.

Examples of the storage battery 1022 include a sodium-sulfur battery, a redox flow battery, a lithium ion battery, a lead battery, a nickel hydrogen battery, and the like, and desirably the storage battery 1022 is a sodium-sulfur battery.

The diesel power generator 1024 may be replaced with another type of power generator that can adjust generated power, other than the renewable energy power generator 1020. For example, the diesel power generator 1024 may be replaced with a gas turbine power generator, a water reservoir-type hydroelectric power generator, a pondage-type hydroelectric power generator, or the like.

Each of the control devices 1040 and 1044 includes a communication device, an output adjustment device, and the like. The control device 1042 includes a communication device, a bidirectional converter, an air conditioner, a heater, a temperature adjuster, and the like.

The separate/limit mechanisms 1086 and 1088 can execute operation of electrically separating each of the individual loads 1066 and 1068 from the power distribution line 1030 and stopping supply of power to the individual loads 1066 and 1068, and execute operation of limiting a power value of the power supplied to the individual loads 1066 and 1068 to a set upper limit value or below. Each of the separate/limit mechanisms 1086 and 1088 may be replaced with a separate mechanism that can exclusively execute the former operation, or may be replaced with a limit mechanism that can exclusively execute the latter operation. The former operation is, for example, executed by a breaker, an AC/DC/AC converter including a semiconductor element, or the like. The latter operation is executed by a controller that controls the number of operating ones of apparatuses included in the load 1028, operation settings thereof, or the like. Examples of the apparatus include a pump, an air conditioner, a machine tool, and the like. When the apparatus is a pump, the apparatus setting is a flow rate or the like. When the apparatus is air conditioner equipment, the apparatus setting is a set temperature or the like. When the apparatus is a machine tool, the apparatus setting is processing speed or the like.

The EMS 1048 measures generated power of the renewable energy power generator 1020, charged/discharged power of the storage battery 1022, generated power of the diesel power generator 1024, demanded power of the control device 1026, and demanded power of the load 1028, and controls generated power of the renewable energy power generator 1020, charged/discharged power of the storage battery 1022, generated power of the diesel power generator 1024, and the separate/limit mechanisms 1086 and 1088.

The independent system 1000 may include elements different from the elements described above. The independent system 1000 may include at least one of an additional renewable energy power generator and a control device therefor, an additional storage battery and a control device therefor, and an additional diesel power generator and a control device therefor. The diesel power generator 1024 and the control device 1044 therefor may be omitted. The independent system 1000 may include an additional individual load, and a separate/limit mechanism to be paired with the individual load. One pair out of the pair of the individual load 1066 and the separate/limit mechanism 1086 and the pair of the individual load 1068 and the separate/limit mechanism 1088 may be omitted.

2 Details of Control Performed by Energy Management System

Figure 2:
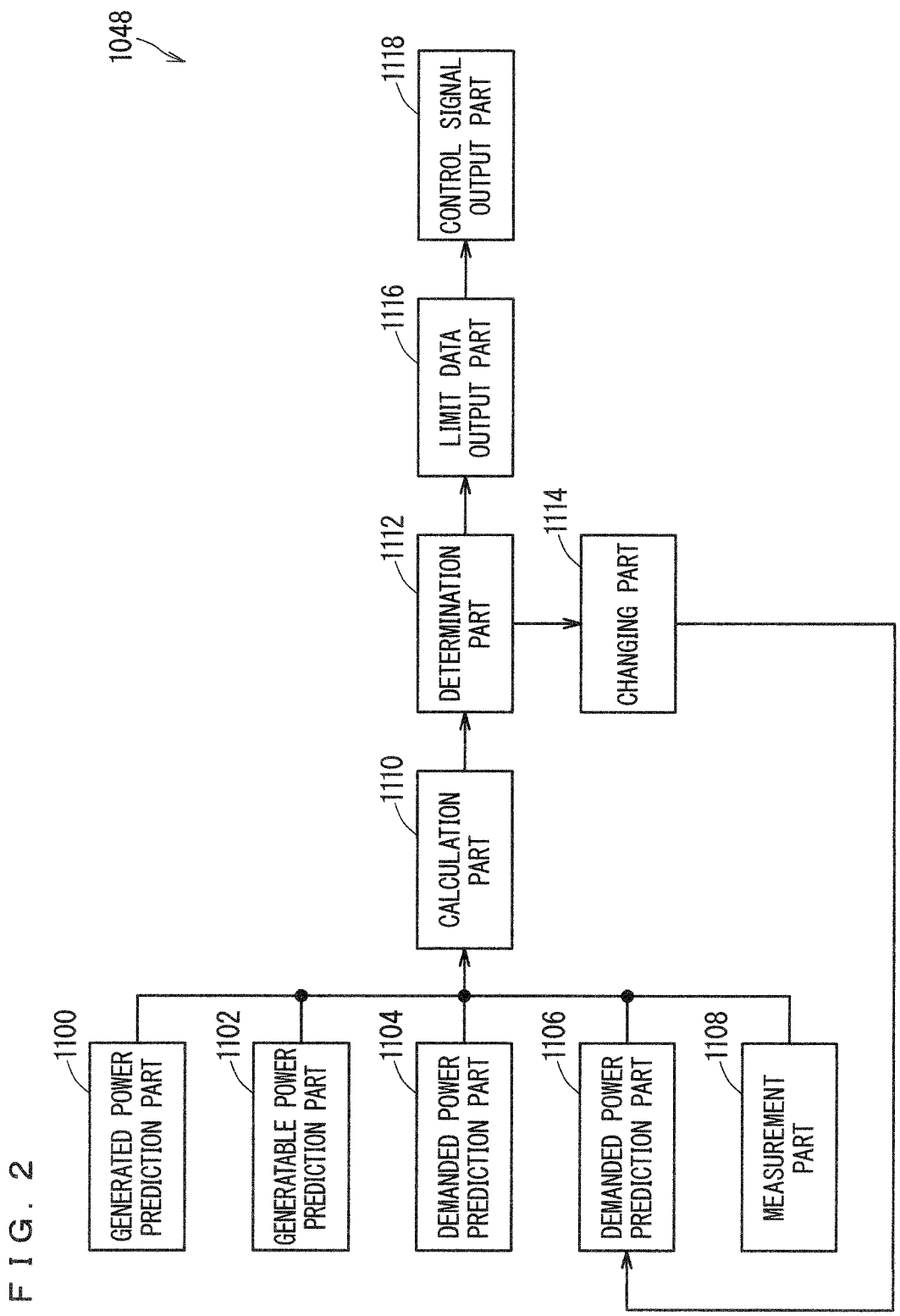
FIG. 2 is a block diagram illustrating an energy management system included in the independent system.

FIG. 2 is a block diagram illustrating the energy management system included in the independent system.

The EMS 1048 includes a generated power prediction part 1100, a generatable power prediction part 1102, a demanded power prediction part 1104 that predicts demanded power of the control device 1026, a demanded power prediction part 1106 that predicts demanded power of the load 1028, a measurement part 1108, a calculation part 1110, a determination part 1112, a changing part 1114, a limit data output part 1116, and a control signal output part 1118. These elements are configured by causing a computer to execute programs. All or a part of these elements may be configured by hardware that does not execute programs.

The generated power prediction part 1100 predicts generated power of the renewable energy power generator 1020 at each time in a future prediction period, obtains a resultant prediction value (renewable energy power generation prediction value), and outputs the obtained renewable energy power generation prediction value to the calculation part 1110.

The generatable power prediction part 1102 predicts generatable power of the diesel power generator 1024 at each time in a future prediction period, obtains a resultant prediction value (diesel power generation prediction value), and outputs the obtained diesel power generation prediction value to the calculation part 1110. In the case that the diesel power generator 1024 is omitted, the generatable power prediction part 1102 is also omitted.

The demanded power prediction part 1104 predicts demanded power of the control device 1026 at each time in a future prediction period, obtains a resultant prediction value (control device demand prediction value), and outputs the obtained control device demand prediction value to the calculation part 1110.

The demanded power prediction part 1106 predicts demanded power of the load 1028 at each time in a future prediction period, obtains a resultant prediction value (load demand prediction value), and outputs the obtained load demand prediction value to the calculation part 1110. The load demand prediction value is a prediction value on the assumption that a power supply limit to be described later is applied to the load 1028.

The measurement part 1108 measures a state of the storage battery 1022, and outputs the measured state of the storage battery 1022 to the calculation part 1110. The measured state of the storage battery 1022 includes a temperature, a power storage amount, and the like of the storage battery 1022.

The calculation part 1110 calculates a prediction value (storage battery charged/discharged power prediction value) of charged/discharged power of the storage battery 1022 at each time in a future prediction period for the independent system 1000, based on the input renewable energy power generation prediction value, diesel power generation prediction value, control device demand prediction value, load demand prediction value, and state of the storage battery 1022. All or a part of the renewable energy power generation prediction value, the diesel power generation prediction value, the control device demand prediction value, the load demand prediction value, and the state of the storage battery 1022 may be acquired from the outside of the EMS 1048. In the case that the diesel power generator 1024 is omitted, the diesel power generation prediction value is not taken into consideration.

The determination part 1112 determines whether or not charge or discharge of the storage battery 1022 with power that matches the calculated storage battery charged/discharged power prediction value is possible. For example, the determination part 1112 predicts a temperature and a power storage amount of the storage battery 1022 at each time in a future prediction period and obtains prediction values thereof, and when the obtained prediction values fall within a set range in the prediction period, the determination part 1112 determines that charge or discharge of the storage battery 1022 is possible.

When the determination part 1112 determines that charge or discharge of the storage battery 1022 is not possible, the changing part 1114 changes details of the power supply limit so that the power supply limit for the load 1028 is tightened, and records the changed details of the power supply limit in limit data. The changed power supply limit is not immediately applied to the load 1028. Tightening the power supply limit includes stopping supply of power to at least one of the individual loads 1066 and 1068, limiting the power value of power to be supplied to at least one of the individual loads 1066 and 1068 to a set upper limit value or below, and the like.

The limit data recording the changed details of the power supply limit is input to the demanded power prediction part 1106 that predicts the demanded power of the load 1028. In conjunction with input of the limit data, the demanded power prediction part 1106 predicts demanded power of the load 1028 at each time in the future prediction period again, and reoutputs the load demand prediction value. The reoutput load demand prediction value is a prediction value of the demanded power of the load 1028 on the assumption that the changed power supply limit is applied to the load 1028.

In conjunction with the reoutput of the load demand prediction value, the calculation part 1110 calculates the storage battery charged/discharged power prediction value at each time in the future prediction period again. In conjunction with recalculation of the storage battery charged/discharged power prediction value, the determination part 1112 redetermines whether or not charge or discharge of the storage battery 1022 with power that matches the recalculated storage battery charged/discharged power prediction value is possible.

When the determination part 1112 determines that charge or discharge of the storage battery 1022 is possible, the limit data output part 1116 outputs limit data recording the details of the power supply limit. Further, when the determination part 1112 determines that discharge of the storage battery 1022 is not possible but the power supply limit is already the most tightened power supply limit, the limit data output part 1116 outputs limit data recording the fact that the power supply limit is the most tightened power supply limit.

When the power supply limit is tightened due to stopping of supply of power to at least one of the individual loads 1066 and 1068, the power supply limit becomes the most tightened power supply limit at the time when supply of power to all of the individual loads 1066 and 1068 is stopped in all of the times in the prediction period.

When the power supply limit is tightened due to limiting of the power value of the power to be supplied to at least one of the individual loads 1066 and 1068 to a set upper limit value or below, the power supply limit becomes the most tightened power supply limit at the time when the power value of the power to be supplied to all of the individual loads 1066 and 1068 is limited to the set upper limit value or below in all of the times in the prediction period.

The control signal output part 1118 generates, based on the limit data, a control signal for causing the limit mechanism 1046 to perform the power supply limit including the details recorded in the output limit data, and outputs the generated control signal to the limit mechanism 1046.

In the independent system 1000, when it is determined that charge or discharge of the storage battery 1022 with power that matches the storage battery charged/discharged power prediction value is not possible, the power supply limit is tightened until it can be eventually determined that charge or discharge of the storage battery 1022 with power that matches the storage battery charged/discharged power prediction value is possible.

In this manner, when there is a deficiency in the supply of power from the renewable energy power generator 1020, the storage battery 1022, and the diesel power generator 1024 in the independent system 1000 and it is predicted that the power cannot be supplied to all of the control device 1026 and the load 1028, the details of the power supply limit to be applied to the load 1028 in order to maintain the supply of power to the control device 1026 can be identified based on the limit data. Thus, the capability of maintaining the supply of power to the control device 1026 is enhanced in the independent system 1000, and the independent system 1000 can be caused to stably operate.

For example, a power supply system including the renewable energy power generator 1020, the storage battery 1022, the diesel power generator 1024, the control device 1040, the control device 1042, and the control device 1044 can be made less frequently restarted, with the result that an operating rate of the power supply system can be enhanced. Further, power failure in the independent system 1000 can be made less frequently caused, with the result that failure and deterioration of the devices included in the independent system 1000 can be prevented.

Further, in the independent system 1000, when it cannot be determined that charge or discharge of the storage battery 1022 with power that matches the storage battery charged/discharged power prediction value is possible even if the power supply limit is most tightened, the power supply limit is set to the most tightened power supply limit. In this manner, even if the supply of power to the control device 1026 cannot be maintained, timing at which the supply of power to the control device 1026 cannot be maintained can be deferred.

The changing part 1114 desirably changes the power supply limit so that power consumption of the control device 1042 that controls the storage battery 1022 is reduced.

For example, in the case that the storage battery 1022 is a sodium-sulfur battery, and the control device 1042 includes a heater that heats the sodium-sulfur battery and a cooling fan that cools the sodium-sulfur battery, the change of tightening the power supply limit is performed so as to prevent operation of the cooling fan due to an increase in the temperature of the sodium-sulfur battery.

Preventing the increase in the temperature of the sodium-sulfur battery can be carried out by reducing a discharge time period of the sodium-sulfur battery, reducing discharged power of the sodium-sulfur battery, and the like. Preventing operation of the cooling fan not only contributes to reduction in power consumption of the cooling fan but also to reduction in power consumption of the heater. This is because, when the heat dissipation amount owing to the cooling fan is reduced, the heating amount owing to the heater is reduced as well.

In addition, preventing operation of the cooling fan also contributes to increase in a time period in which the temperature of the sodium-sulfur battery can be maintained at a high temperature after stoppage of the supply of power to the control device 1042, leading to reduction in failure of the sodium-sulfur battery.

Alternatively, in the case that the storage battery 1022 is a lithium ion battery, and the control device 1042 includes a cooling mechanism such as a cooler, a cooling fan, and an air conditioner that cools the lithium ion battery, the power supply limit is tightened so as to prevent operation of the cooling mechanism due to an increase in the temperature of the lithium ion battery. Preventing the increase in the temperature of the lithium ion battery can be carried out by reducing charged/discharged power of the lithium ion battery and the like.

Figure 3:
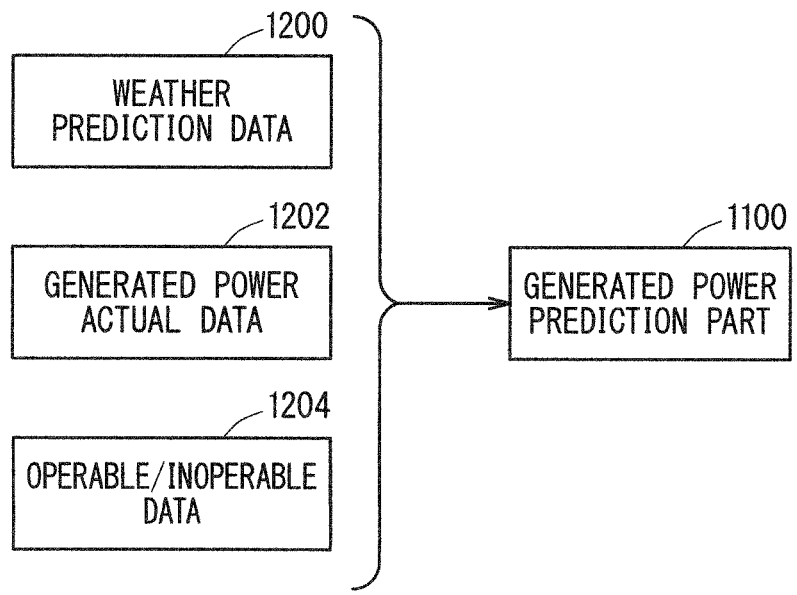
FIG. 3 is a diagram illustrating data used as a basis for prediction of generated power of a renewable energy power generator in the independent system.

3 Data Used as Basis for Prediction of Generated Power of Renewable Energy Power Generator FIG. 3 is a diagram illustrating data used as a basis for prediction of the generated power of the renewable energy power generator in the independent system.

The generated power prediction part 1100 obtains a prediction value of the generated power of the renewable energy power generator 1020 (renewable energy power generation prediction value) at each time in a future prediction period, based on weather prediction data 1200, generated power actual data 1202, and operable/inoperable data 1204 illustrated in FIG. 3, for example.

The weather prediction data 1200 indicates a prediction value of weather at each time in a future prediction period. The generated power actual data 1202 indicates an actual value of the generated power of the renewable energy power generator 1020 at each time in a previous recording period.

The operable/inoperable data 1204 indicates stop/non-stop of power generation of the renewable energy power generator 1020 due to periodic maintenance, failure that has already been caused, or the like in a future prediction period. When power generation is not scheduled to be stopped in the prediction period, the operable/inoperable data 1204 may be data indicating that the power generation of the renewable energy power generator 1020 is not to be stopped and the renewable energy power generator 1020 can be caused to operate in the entire period of the prediction period, or may be data indicating that the renewable energy power generator 1020 cannot be caused to operate in a partial period of the prediction period, which that is inferred according to likeliness of occurrence of the failure.

For example, the generated power prediction part 1100 obtains the renewable energy power generation prediction value by correcting the actual value of the generated power of the renewable energy power generator 1020 indicated by the generated power actual data 1202, with the prediction value of weather and stop/non-stop of power generation of the renewable energy power generator 1020 that are respectively indicated by the weather prediction data 1200 and the operable/inoperable data 1204.

4 Data Used as Basis for Generatable Power of Diesel Power Generator Etc.

Figure 4:
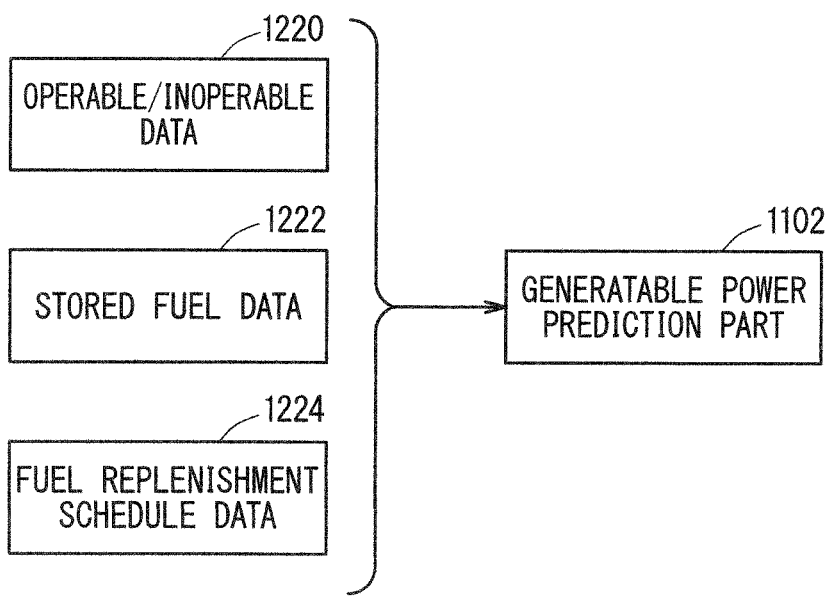
FIG. 4 is a diagram illustrating data used as a basis for prediction of generatable power of a diesel power generator in the independent system.

FIG. 4 is a diagram illustrating data used as a basis for prediction of the generatable power of the diesel power generator in the independent system.

The generatable power prediction part 1102 obtains a prediction value of the generatable power of the diesel power generator 1024 (diesel power generation prediction value) at each time in a future prediction period, based on operable/inoperable data 1220, stored fuel data 1222, and fuel replenishment schedule data 1224 illustrated in FIG. 4, for example.

The operable/inoperable data 1220 indicates stop/non-stop of power generation of the diesel power generator 1024 due to periodic maintenance, failure that has already been caused, or the like in a future prediction period. When power generation is not scheduled to be stopped in the prediction period, the operable/inoperable data 1220 may be data indicating that the power generation of the diesel power generator 1024 is not to be stopped and the diesel power generator 1024 can be caused to operate in the entire period of the prediction period, or may be data indicating that the diesel power generator 1024 cannot be caused to operate in a partial period of the prediction period that is inferred according to likeliness of occurrence of the failure.

The stored fuel data 1222 indicates an amount of fuel that has been stored and that can be used by the diesel power generator 1024 for power generation. The fuel replenishment schedule data 1224 indicates a scheduled day on which replenishment of fuel used for power generation is scheduled to be performed regarding the diesel power generator 1024.

For example, the generatable power prediction part 1102 calculates the generatable power of the diesel power generator 1024 up to the scheduled day of replenishment of the fuel indicated by the fuel replenishment schedule data 1224, based on the stored fuel data 1222. Further, the generatable power prediction part 1102 obtains the diesel power generation prediction value by correcting the calculated generatable power of the diesel power generator 1024 with the reference of stop/non-stop of the power generation of the diesel power generator 1024 indicated by the operable/inoperable data 1220. When the independent system 1000 includes a plurality of diesel power generators 1024, the generatable power prediction part 1102 calculates maximum generatable power, in consideration of the number of operable diesel power generators 1024.

Figure 5:
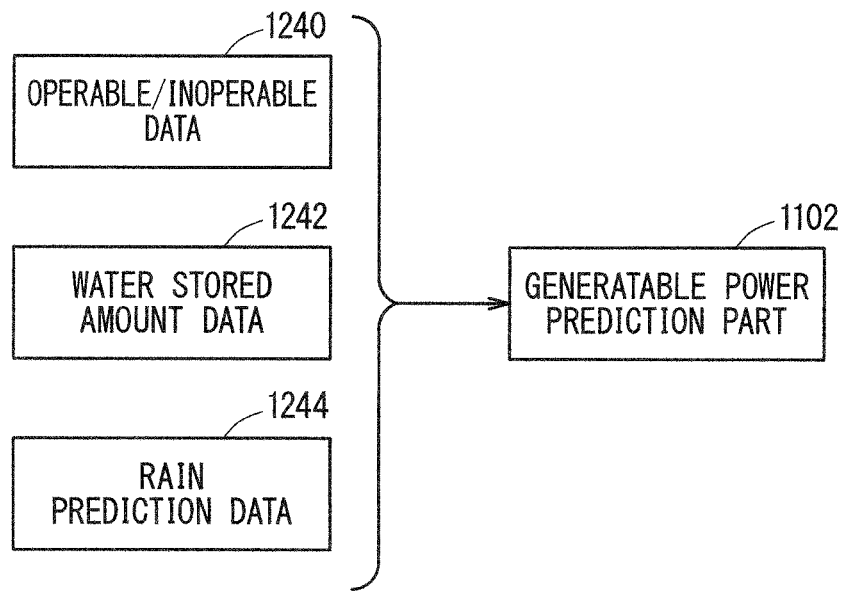
FIG. 5 is a diagram illustrating data used as a basis for prediction of generatable power of a water reservoir-type hydroelectric power plant in the independent system.

FIG. 5 is a diagram illustrating data used as a basis for prediction of the generatable power of the water reservoir-type hydroelectric power plant in the independent system.

When the diesel power generator 1024 is replaced with a water reservoir-type hydroelectric power generator, the generatable power prediction part 1102 obtains a prediction value of the generatable power of the water reservoir-type hydroelectric power generator (water reservoir-type hydroelectric power generation prediction value) at each time in a future prediction period, based on operable/inoperable data 1240, water stored amount data 1242, and rain prediction data 1244 illustrated in FIG. 5, for example.

The operable/inoperable data 1240 is data indicating stop/non-stop of power generation of the water reservoir-type hydroelectric power generator due to periodic maintenance, failure that has already been caused, or the like in a future prediction period. When power generation is not scheduled to be stopped in the prediction period, the operable/inoperable data 1240 may be data indicating that the power generation of the water reservoir-type hydroelectric power generator is not to be stopped and the water reservoir-type hydroelectric power generator can be caused to operate in the entire period of the prediction period, or may be data indicating that the water reservoir-type hydroelectric power generator cannot be caused to operate in a partial period of the prediction period that is inferred according to likeliness of occurrence of the failure. The water stored amount data 1242 indicates an amount of water that has been stored and that can be used by the water reservoir-type hydroelectric power generator for power generation. The rain prediction data 1244 indicates an expected date and time when rain to increase water used by the water reservoir-type hydroelectric power generator for power generation is expected.

For example, the generatable power prediction part 1102 calculates the generatable power of the water reservoir-type hydroelectric power generator up to the expected date and time when rain is expected, which is indicated by the rain prediction data 1244, based on the water stored amount data 1242. Further, the generatable power prediction part 1102 obtains the water reservoir-type hydroelectric power generation prediction value by correcting the calculated generatable power of the water reservoir-type hydroelectric power generator with the reference of stop/non-stop of the power generation of the water reservoir-type hydroelectric power generator indicated by the operable/inoperable data 1240. When the independent system 1000 includes a plurality of water reservoir-type hydroelectric power generators, the generatable power prediction part 1102 calculates maximum generatable power, based on the number of operable water reservoir-type hydroelectric power plants. Instead of the expected date and time when rain is estimated, indicated by the rain prediction data 1244, scheduled date and time when water supply is scheduled, which is indicated by water supply scheduled data, may be used.

5 Data Used as Basis for Prediction of Demanded Power of Control Device

Figure 6:
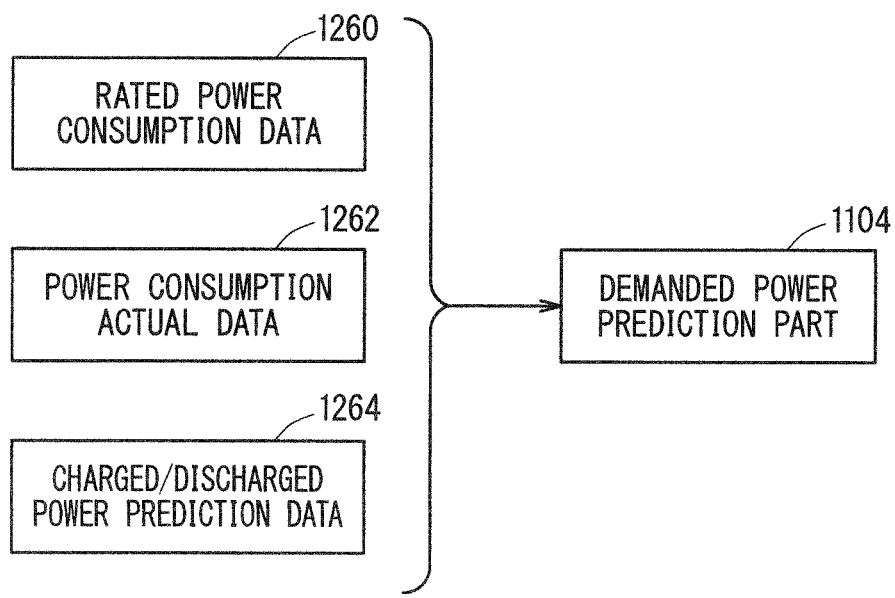
FIG. 6 is a diagram illustrating data used as a basis for prediction of demanded power of a control device in the independent system.

FIG. 6 is a diagram illustrating data used as a basis for prediction of the demanded power of the control device in the independent system.

The demanded power prediction part 1104 obtains a prediction value of the demanded power of the control device 1026 (control device demand prediction value) at each time in a future prediction period, based on rated power consumption data 1260, power consumption actual data 1262, and charged/discharged power prediction data 1264 illustrated in FIG. 6, for example.

The rated power consumption data 1260 indicates rated power consumption of the control device 1040, the control device 1042, the control device 1044, the separate/limit mechanism 1086, the separate/limit mechanism 1088, and the EMS 1048. The power consumption actual data 1262 indicates an actual value of power consumption of the control device 1040, the control device 1042, the control device 1044, the separate/limit mechanism 1086, the separate/limit mechanism 1088, and the EMS 1048 at each time in a previous recording period. The charged/discharged power prediction data 1264 indicates the storage battery charged/discharged power prediction value calculated by the calculation part 1110.

As an example, a case in which the control device 1042 that controls the storage battery 1022 includes an air conditioner, a heater, a temperature adjuster, and the like is considered.

In this case, the demanded power prediction part 1104 calculates the sum of the rated power consumption of the control device 1040, the control device 1042, the control device 1044, the separate/limit mechanism 1086, the separate/limit mechanism 1088, and the EMS 1048 indicated by the rated power consumption data 1260. Further, the demanded power prediction part 1104 calculates a prediction value of the heat generation amount of the storage battery 1022, based on the storage battery charged/discharged power prediction value indicated by the charged/discharged power prediction data 1264, and calculates a prediction value of the power consumption of the air conditioner, the heater, the temperature adjuster, and the like, based on the calculated prediction value.

Then, the demanded power prediction part 1104 obtains the control device demand prediction value by correcting the calculated sum of the rated power consumption with the reference of the calculated prediction value of the power consumption.

Instead of the sum of the rated power consumption, the sum of time average values of actual values of the power consumption of the control device 1040, the control device 1042, the control device 1044, the separate/limit mechanism 1086, the separate/limit mechanism 1088, and the EMS 1048 indicated by the power consumption actual data 1262 may be used.

6 Data Used as Basis for Prediction of Demanded Power of Load

Figure 7:
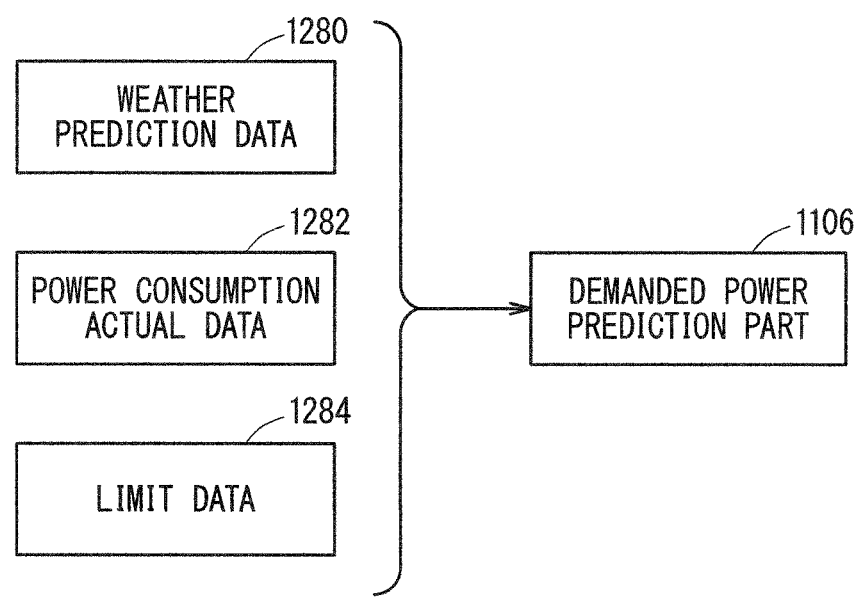
FIG. 7 is a diagram illustrating data used as a basis for prediction of demanded power of a load in the independent system.

FIG. 7 is a diagram illustrating data used as a basis for prediction of the demanded power of the load in the independent system.

The demanded power prediction part 1106 predicts a prediction value of the demanded power of the load 1028 (load demand prediction value), based on weather prediction data 1280, power consumption actual data 1282, and limit data 1284 illustrated in FIG. 7, for example.

The weather prediction data 1280 indicates a prediction value for weather at each time in a future prediction period. The power consumption actual data 1282 indicates an actual value of power consumption of the individual loads 1066 and 1068 at each time in a previous recording period. The limit data 1284 indicates the details of the power supply limit described above.

For example, the demanded power prediction part 1106 calculates, based on the power consumption actual data 1282, an assumed value of the demanded power of the load 1028 on the assumption that the power supply limit including the details recorded in the limit data 1284 is applied to the load 1028. Further, the demanded power prediction part 1106 obtains the load demand prediction value by correcting the calculated assumed value of the demanded power of the load 1028 with reference of the prediction value for weather indicated by the weather prediction data 1280.

7 Example of Time-Dependent Change of State of Independent System

FIGS. 8A to 8E and FIGS. 9A to 9E are graphs showing examples of time-dependent change of the demanded power, the generated power, the charged/discharged power, the temperature, and the power storage amount. FIGS. 8A to 8E are graphs showing examples of time-dependent change when the power supply limit is not applied to the load. FIGS. 9A to 9E are graphs showing examples of time-dependent change when the power supply limit is applied to the load.

Figure 9A:
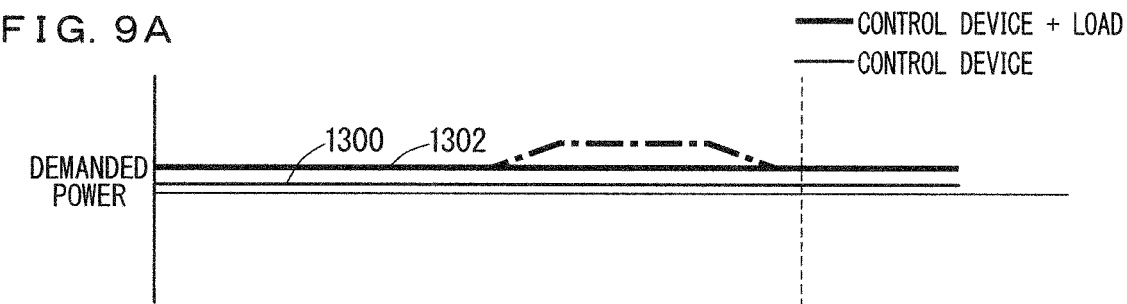
FIGS. 9A to 9E are graphs showing examples of time-dependent change of the demanded power, the generated power, the charged/discharged power, the temperature, and the power storage amount when the power supply limit is applied to the load.
Figure 9B:
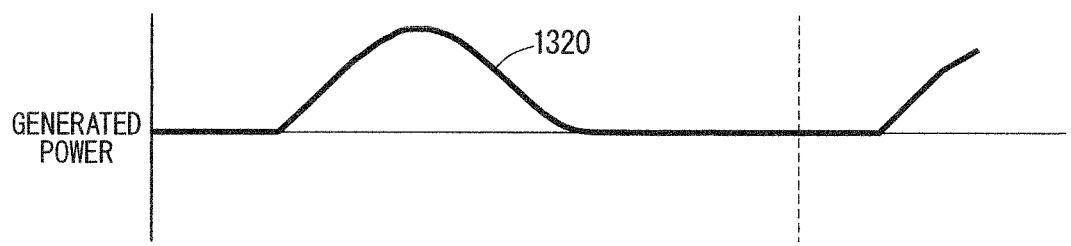
Figure 9C:
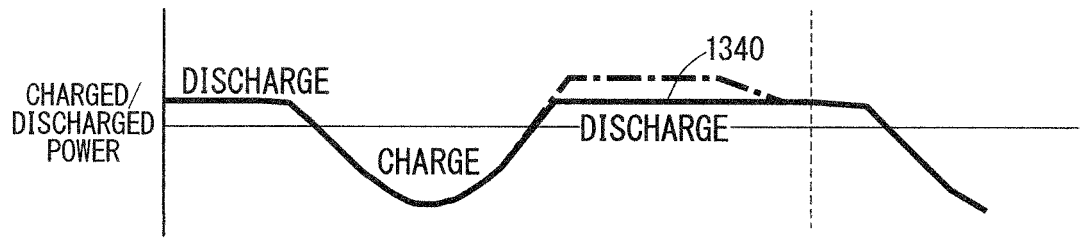
Figure 9D:
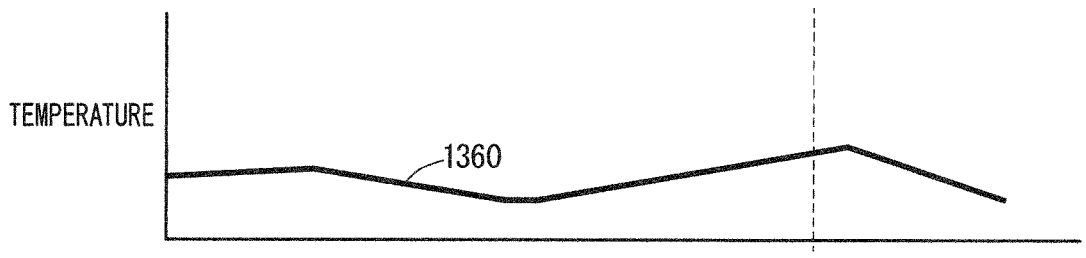
Figure 9E:
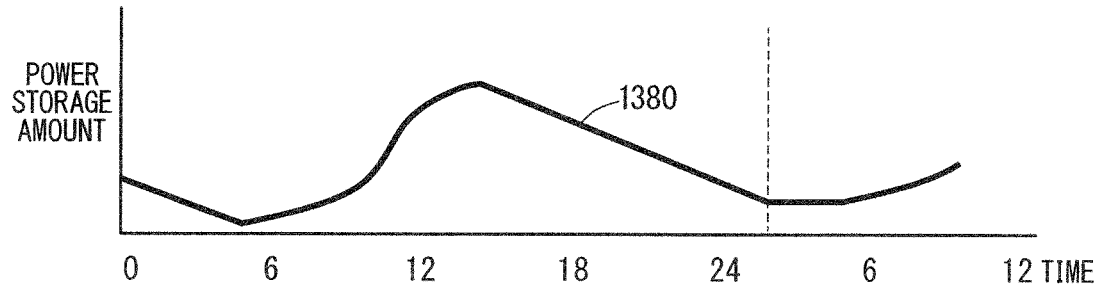

FIG. 8A and FIG. 9A each show an example of time-dependent change of demanded power 1300 of the control device 1026 and a sum 1302 of demanded power of the control device 1026 and the load 1028. FIG. 8B and FIG. 9B each show an example of time-dependent change of a sum 1320 of generated power of the renewable energy power generator 1020 and the diesel power generator 1024. FIG. 8C and FIG. 9C each show an example of time-dependent change of charged/discharged power 1340 of the storage battery 1022. FIG. 8D and FIG. 9D each show an example of time-dependent change of temperature 1360 of the storage battery 1022. FIG. 8E and FIG. 9E each show an example of time-dependent change of a power storage amount 1380 of the storage battery 1022.

In the case shown in FIG. 8A, because the power supply limit is not applied to the load 1028, during the time period from about 13:00 to about 24:00 of day 1, the sum 1302 of the demanded power of the control device 1026 and the load 1028 is increased due to an increase of the demanded power of the load 1028. Along with this, similarly, during the time period from about 13:00 to about 24:00 of day 1, the discharged power 1340 of the storage battery 1022 is increased as shown in FIG. 8C, the temperature 1360 of the storage battery 1022 is increased as shown in FIG. 8D, and the power storage amount 1380 of the storage battery 1022 is decreased as shown in FIG. 8E.

Further, as shown in FIG. 8E, at and after the time when the power storage amount 1380 of the storage battery 1022 is decreased to 0 about 2:00 of day 2, as shown in FIG. 8C, the charged/discharged power 1340 of the storage battery 1022 also reaches 0, and charge or discharge of the storage battery 1022 which originally is to be performed along with time variation indicated by the broken line in FIG. 8C is not performed. Further, the sum 1302 of the demanded power indicated by the broken line in FIG. 8A becomes not being able to be supplied to the control device 1026 and the load 1028 either, and the sum 1320 of the generated power of the renewable energy power generator 1020 and the diesel power generator 1024 indicated by the broken line in FIG. 8B not being able to be used either. The reason why the generated power becomes not being able to be used is because power becomes not being able to be supplied to the control device 1026.

Further, as shown in time during the time period from about 13:00 to about 24:00 of day 1 of FIG. 8D, when the temperature 1360 of the storage battery 1022 is increased, the cooling fan needs to be to operated, thus leading to increase in the power consumption of the control device 1042.

In contrast, in the case shown in FIG. 9A, with the power supply limit being applied to the load 1028 during the time period from about 13:00 to about 24:00 of day 1, increase in the demanded power of the load 1028 is prevented. Owing to this, increase in the sum 1302 of the demanded power of the control device 1026 and the load 1028 is prevented.

Along with this, similarly, during the time period from about 13:00 to about 24:00 of day 1, increase in the discharged power 1340 of the storage battery 1022 is prevented as shown in FIG. 9C, increase in the temperature 1360 of the storage battery 1022 is prevented as shown in FIG. 9D, and reduction in the power storage amount 1380 of the storage battery 1022 is prevented as shown in FIG. 9E.

As a result, at and after about 2:00 of day 2 as well, as shown in FIG. 9E, the power storage amount 1380 of the storage battery 1022 does not become 0, and charge or discharge of the storage battery 1022 along the charged/discharged power 1340 shown in FIG. 9C becomes possible. Further, the sum 1302 of the demanded power shown in FIG. 9A also becomes being able to be supplied to the control device 1026 and the load 1028, and the sum 1320 of the generated power of the renewable energy power generator 1020 and the diesel power generator 1024 shown in FIG. 9B also becomes being able to be used.

Further, in this case, as shown in FIG. 9D, the increase in the temperature 1360 of the storage battery 1022 also is prevented during the time period from about 13:00 to about 24:00 of day 1 as well. This eliminates the necessity of causing the cooling fan to operate, thus maintaining power consumption of the control device 1042 to be small.

8 Comparison to Prior Art

In an independent-type power supply system described in Japanese Patent Application Laid-Open No. 2013-176234, when there is a deficiency in the power generation amount and the state of charge SOC(t) falls below a minimum charge power energy Smin, the deficiency of the state of charge SOC(t) is prevented by limiting demanded power Pd of a load device and increasing the charge amount of a power storage device (paragraphs 0023 and 0045).

In contrast, the independent system 1000 limits the supply of power to the load 1028 in such a manner that supply of power to the control device 1026 is not stopped. Therefore, in the independent system 1000, even if a minimum charge power energy cannot be secured, there is no problem as far as power can be supplied from the renewable energy power generator 1020 and/or the diesel power generator 1024 to the load 1028.

Note that, in the independent-type power supply system described in Japanese Patent Application Laid-Open No. 2013-176234, the load device includes a load for adjustment and a load; however, in which of the load for adjustment and the load an element corresponding to the control device 1026 is included in unclear.

While the invention has been shown and described in detail, the foregoing description is in all aspects illustrative and not restrictive. It is therefore understood that numerous unillustrated modifications can be devised without departing from the scope of the invention.

What is claimed is:

1. An energy management system for an independent system including a renewable energy power generator, a storage battery, a control device, and a load, the energy management system comprising:
    a calculation part configured to calculate a prediction value of charged/discharged power of the storage battery, based on a prediction value of generated power of the renewable energy power generator, a prediction value of demanded power of the control device, and a prediction value of demanded power of the load on an assumption that power is supplied under a predetermined power supply limit;
    a determination part configured to determine whether or not charge or discharge of the storage battery with power matching the prediction value of the charged/discharged power of the storage battery is possible;
    a changing part configured to change details of the power supply limit so that the power supply limit for the load is tightened when it is determined that the charge or discharge of the storage battery is not possible; and
    a limit data output part configured to output limit data recording a detail of the power supply limit when it is determined that the charge or discharge of the storage battery is possible.

2. The energy management system according to claim 1, wherein
    tightening the power supply limit includes stopping supply of power to an individual load included in the load.

3. The energy management system according to claim 1, wherein
    tightening the power supply limit includes limiting a power value of power supplied to an individual load included in the load to a set upper limit value or below.

4. The energy management system according to claim 1, wherein
    when it is determined that the charge or discharge of the storage battery is not possible but the power supply limit is already a most tightened power supply limit, the limit data output part outputs the limit data recording a fact that the power supply limit is the most tightened power supply limit.

5. The energy management system according to claim 1, wherein
    the independent system further includes a power generator other than the renewable energy power generator, and
    the calculation part calculates the prediction value of the charged/discharged power of the storage battery, based on the prediction value of the generated power of the renewable energy power generator, the prediction value of the demanded power of the control device, the prediction value of the demanded power of the load on the assumption that the power is supplied under the predetermined power supply limit, and a prediction value of generatable power of the power generator.

6. The energy management system according to claim 5, wherein
    the control device includes a limit mechanism capable of executing at least one operation of stopping supply of power to an individual load included in the load and operation of limiting a power value of the power supplied to the individual load included in the load to a set upper limit value or below, and
    the energy management system further includes a control signal output part configured to generate, based on the limit data, a control signal for causing the limit mechanism to perform operation of applying the power supply limit to the load, and output the control signal to the limit mechanism.

7. The energy management system according to claim 5, wherein
    the control device includes a storage battery control device configured to control the storage battery, and
    the changing part changes the details of the power supply limit so that power consumption of the storage battery control device is reduced when it is determined that the charge or discharge of the storage battery is not possible.

8. The energy management system according to claim 7, wherein
the storage battery is a sodium-sulfur battery,
the storage battery control device includes a cooling fan configured to cool the sodium-sulfur battery, and
the power consumption of the storage battery control device is reduced by preventing operation of the cooling fan by at least one of reducing a discharge time period of the sodium-sulfur battery and reducing discharged power of the sodium-sulfur battery.

9. The energy management system according to claim 1, wherein
the control device includes a storage battery control device configured to control the storage battery, and
the changing part changes the details of the power supply limit so that power consumption of the storage battery control device is reduced when it is determined that the charge or discharge of the storage battery is not possible.

10. The energy management system according to claim 9, wherein
the storage battery is a sodium-sulfur battery,
the storage battery control device includes a cooling fan configured to cool the sodium-sulfur battery, and
the power consumption of the storage battery control device is reduced by preventing operation of the cooling fan by at least one of reducing a discharge time period of the sodium-sulfur battery and reducing discharged power of the sodium-sulfur battery.

11. The energy management system according to claim 9, wherein
the control device includes a limit mechanism capable of executing at least one operation of stopping supply of power to an individual load included in the load and operation of limiting a power value of the power supplied to the individual load included in the load to a set upper limit value or below, and
the energy management system further includes a control signal output part configured to generate, based on the limit data, a control signal for causing the limit mechanism to perform operation of applying the power supply limit to the load, and output the control signal to the limit mechanism.

12. The energy management system according to claim 1, wherein
the energy management system is included in the control device, and
the control device further includes a power generator control device configured to control the renewable energy power generator and a storage battery control device configured to control the storage battery.

13. The energy management system according to claim 1, wherein
the control device includes a limit mechanism capable of executing at least one operation of stopping supply of power to an individual load included in the load and operation of limiting a power value of the power supplied to the individual load included in the load to a set upper limit value or below, and
the energy management system further includes a control signal output part configured to generate, based on the limit data, a control signal for causing the limit mechanism to perform operation of applying the power supply limit to the load, and output the control signal to the limit mechanism.

14. An independent system including a renewable energy power generator, a storage battery, a control device including an energy management system, and a load, wherein
the energy management system comprises:
a calculation part configured to calculate a prediction value of charged/discharged power of the storage battery, based on a prediction value of generated power of the renewable energy power generator, a prediction value of demanded power of the control device, and a prediction value of demanded power of the load on an assumption that power is supplied under a predetermined power supply limit;
a determination part configured to determine whether or not charge or discharge of the storage battery with power matching the prediction value of the charged/discharged power of the storage battery is possible;
a changing part configured to change details of the power supply limit so that the power supply limit for the load is tightened when it is determined that the charge or discharge of the storage battery is not possible; and
a limit data output part configured to output limit data recording a detail of the power supply limit when it is determined that the charge or discharge of the storage battery is possible.

15. The independent system according to claim 14, further comprising:
a power generator other than the renewable energy power generator, and
the calculation part calculates the prediction value of the charged/discharged power of the storage battery, based on the prediction value of the generated power of the renewable energy power generator, the prediction value of the demanded power of the control device, the prediction value of the demanded power of the load on the assumption that the power is supplied under the predetermined power supply limit, and a prediction value of generatable power of the power generator.

16. The independent system according to claim 15, wherein
the control device includes a limit mechanism capable of executing at least one operation of stopping supply of power to an individual load included in the load and operation of limiting a power value of the power supplied to the individual load included in the load to a set upper limit value or below, and
the energy management system further includes a control signal output part configured to generate, based on the limit data, a control signal for causing the limit mechanism to perform operation of applying the power supply limit to the load, and output the control signal to the limit mechanism.

17. The independent system according to claim 14, wherein
the control device includes a storage battery control device configured to control the storage battery, and
the changing part changes the details of the power supply limit so that power consumption of the storage battery control device is reduced when it is determined that the charge or discharge of the storage battery is not possible.

18. The independent system according to claim 17, wherein
the storage battery is a sodium-sulfur battery,
the storage battery control device includes a cooling fan configured to cool the sodium-sulfur battery, and
the power consumption of the storage battery control device is reduced by preventing operation of the cooling fan by at least one of reducing a discharge time period of the sodium-sulfur battery and reducing discharged power of the sodium-sulfur battery.

19. The independent system according to claim 14, wherein
the control device includes a limit mechanism capable of executing at least one operation of stopping supply of power to an individual load included in the load and operation of limiting a power value of the power supplied to the individual load included in the load to a set upper limit value or below, and
the energy management system further includes a control signal output part configured to generate, based on the limit data, a control signal for causing the limit mechanism to perform operation of applying the power supply limit to the load, and output the control signal to the limit mechanism.

20. An operation method of an independent system including a renewable energy power generator, a storage battery, a control device, and a load, the operation method comprising the steps of:
calculating a prediction value of charged/discharged power of the storage battery, based on a prediction value of generated power of the renewable energy power generator, a prediction value of demanded power of the control device, and a prediction value of demanded power of the load on an assumption that power is supplied under a predetermined power supply limit;
determining whether or not charge or discharge of the storage battery with power matching the prediction value of the charged/discharged power of the storage battery is possible;
changing details of the power supply limit so that the power supply limit for the load is tightened when it is determined that the charge or discharge of the storage battery is not possible; and
outputting limit data indicating a detail of the power supply limit when it is determined that the charge or discharge of the storage battery is possible.

* * * * *